United States Patent

[11] 3,612,212

| [72] | Inventor | Howard R. Macdonald<br>San Diego, Calif. |
|---|---|---|
| [21] | Appl. No. | 849,070 |
| [22] | Filed | Aug. 11, 1969 |
| [45] | Patented | Oct. 12, 1971 |
| [73] | Assignee | Rohr Corporation<br>Chula Vista, Calif. |

[54] METHOD AND APPARATUS FOR SUPPRESSING THE NOISE OF A JET ENGINE
5 Claims, 9 Drawing Figs.

[52] U.S. Cl. ............................................ 181/33 HC,
181/33 HD, 181/60, 239/127.3, 239/265.17
[51] Int. Cl. .................................................... B64d 33/06,
F01n 1/14
[50] Field of Search............................................ 181/43, 51,
33.22, 33.221, 33.222; 239/127.3, 265.17, 265.11,
265.13, 265.25, 265.27

[56] References Cited
UNITED STATES PATENTS
2,995,200  8/1961  Seifert ........................ 181/33 (.22)

FOREIGN PATENTS
886,201  1/1962  Great Britain ................ 181/33 (.221)
894,299  4/1962  Great Britain ................ 181/33 (.221)

*Primary Examiner*—Robert S. Ward, Jr.
*Attorney*—George E. Pearson

ABSTRACT: A housing surrounds the aft portion of a jet engine and extends rearwardly from the aft end thereof, the housing terminating in a plurality of spaced-apart nozzles which extend different distances in the downstream direction. If the engine is of the fan-jet type, a convoluted ring is preferably attached to the aft end of the engine and the portion of the housing which is disposed between the aft end of the ring and the forward ends of the nozzles serves as a mixing chamber for fan air and exhaust gas. Ambient air flows around the nozzles and mixes with exhaust gas (or exhaust gas and fan air where a fan-jet engine is used) discharged from the nozzles, producing turbulence at selected locations in the exhaust plume of the engine and thereby directing sound energy in predetermined direction.

PATENTED OCT 12 1971

INVENTOR.
HOWARD S. MACDONALD
BY Edwin D. Grant

ATTORNEY

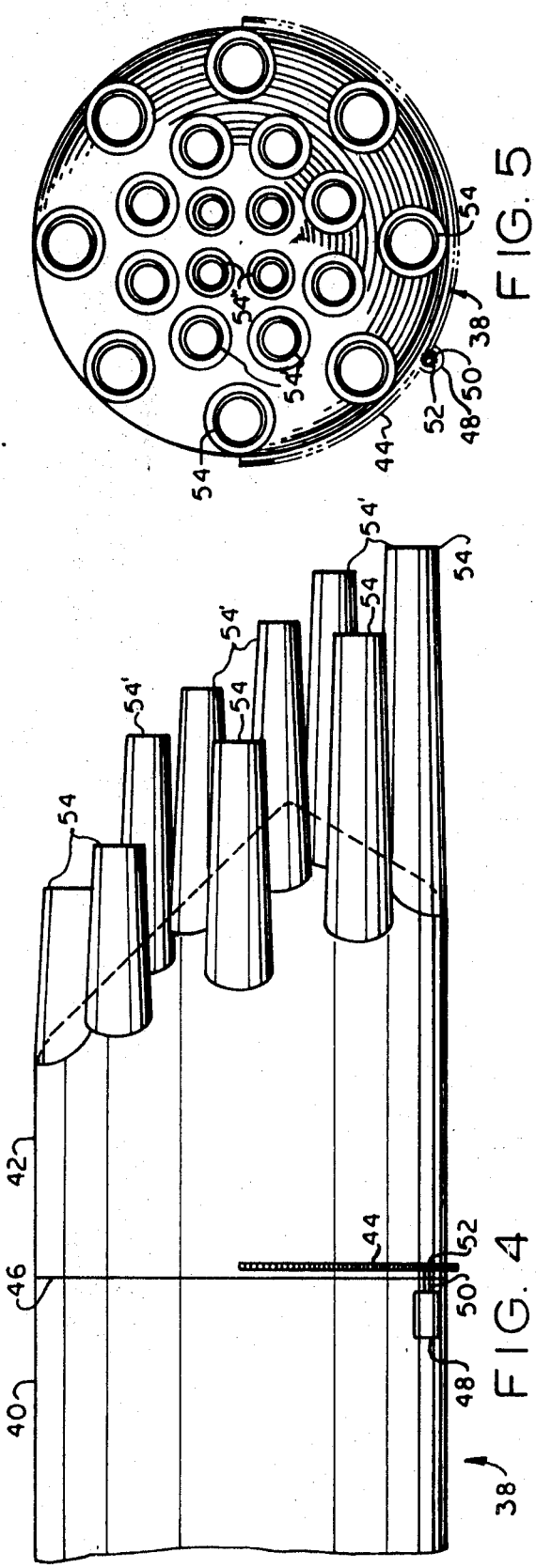
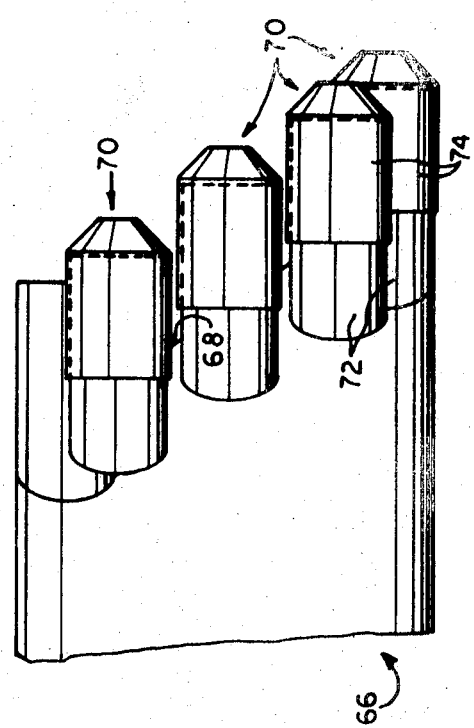
INVENTOR.
HOWARD S. MACDONALD
BY Edwin D. Grant
ATTORNEY

*INVENTOR.*
HOWARD S. MACDONALD
BY Edwin D. Grant

ATTORNEY

3,612,212

METHOD AND APPARATUS FOR SUPPRESSING THE NOISE OF A JET ENGINE

SUMMARY OF THE INVENTION

This invention relates to the suppression of noise created by aircraft jet engine exhaust steams and, more particularly, to a method and apparatus for establishing turbulence in such streams in a manner which permits the frequency, the direction of travel, or both the frequency and the direction of travel of sound waves generated thereby to be controlled.

Tests have indicated that the frequency and direction of travel of sound waves generated by an aircraft jet engine exhaust stream as it flows through the atmosphere depend upon the existence along the expansion boundary of the stream of localized vortices. In accordance with this invention, the exhaust gas of an aircraft jet engine (as well as fan air if the engine is of the fan-jet type) is discharged to the atmosphere so as to produce turbulence at predetermined points in the gas flow, which turbulence produces sound energy which is attenuated more rapidly than the sound energy associated with exhaust streams discharged from thrust nozzles of the types used heretofore. In some embodiments of the invention, turbulence is created in an exhaust stream in such manner that sound energy of the stream is directed upwardly and laterally therefrom, rather than downwardly toward areas lying under the aircraft producing the stream. These desirable effects are achieved by locating the aft ends of a plurality of exhaust nozzles at different distances downstream from the tailpipe of a jet engine enclosed in a housing on which said nozzles are mounted. In a first embodiment of the invention the aforesaid nozzles are arranged in concentric sets, i.e., the longitudinal axes of a first group of nozzles are spaced apart around a circle lying in a plane perpendicular to the longitudinal axis of an associated jet engine housing, the longitudinal axes of a second group of nozzles are spaced apart around a smaller circle lying in the same plane, and additional nozzles are similarly arranged. The aft ends of nozzles in the outermost ring have the same exit diameter and lie in a first plane disposed perpendicular to the longitudinal axis of the housing; the aft ends of the nozzles in the ring next to the outermost ring have the same exit diameter, which is smaller than that of the nozzles in the outermost ring, and they lie in a second plane disposed perpendicular to the longitudinal axis of the housing and spaced downstream from the first plane; and the aft ends of the nozzles in additional inner rings are arranged in the same manner with respect to their exit diameters progressively decreasing in size and the planes which include their aft ends being progressively farther downstream as the distance of the nozzles from the outermost ring increases. In a second embodiment of the invention, the nozzles are also arranged in concentric sets and their exit diameters progressively decrease in size as the distance of the sets from the outermost sets increases. However, in this second embodiment the aft ends of the nozzles in the different sets are generally aligned relative to two planes which substantially are parallel to one another and disposed oblique to the longitudinal axis of the housing, with the aft ends of the nozzles in outermost set being generally aligned in the plane farthest upstream, and the aft ends of the nozzles in the inner sets being aligned in the plane located downstream from the forwardmost plane. For test purposes the aft portion of the housing of the second embodiment may be rotatable about the longitudinal axis thereof and means are provided to rotate this aft portion to thereby change the direction in which the nozzle exit planes slope. In a third embodiment of the invention, one or more nozzles are arranged to discharge exhaust thrust gas in a flat, main exhaust stream having a minimum dimension in the horizontal direction and a maximum dimension in the vertical direction, and other nozzles are mounted so as to discharge at least one exhaust stream against each side boundary of this main stream. The vortices thus produced at the sides of the main stream cause most of the sound energy of the exhaust gas to travel laterally, or horizontally, therefrom. When the invention is used in an aircraft having a fan-jet engine, fan air and exhaust gas thereof are mixed before being discharged through nozzles arranged in one of the described configurations.

DESCRIPTION OF THE DRAWINGS

In the accompanying drawings:

FIG. 4 is a schematic side elevational view of a second embodiment of the invention;

FIG. 5 is a rear elevational view of the second embodiment;

FIG. 9 is a schematic side elevational view of a fourth embodiment of the invention which is advantageous for testing nozzle designs in accordance with the invention.

Throughout the drawings and the following specification, the same numbers designate the same parts.

DETAILED DESCRIPTION

First Embodiment of the Invention

Figure 2:
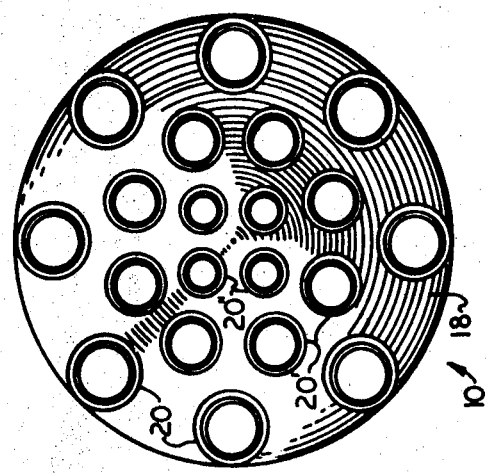
FIG. 2 is a rear elevational view of the same embodiment of the invention.
Figure 1:
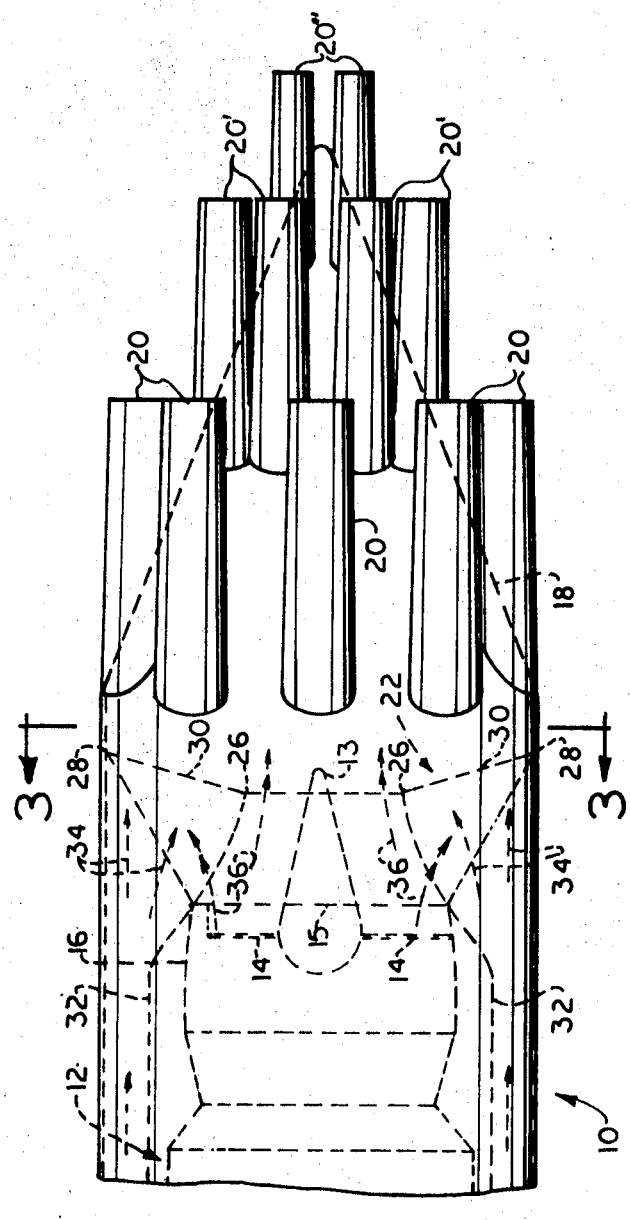
FIG. 1 is a schematic side elevational view of the aft portion of a tubular housing which envelops a fan-jet engine, said housing being either a nacelle or fuselage of an aircraft and having a plurality of nozzles mounted thereon in accordance with one form of the invention.

In FIG. 1 the number 10 generally designates the aft portion of a tubular housing enclosing a fan-jet engine which is generally designated by the number 12 and which has a turbine bearing fairing 13 centrally mounted by means of struts 14 in the aft end of the turbine casing 16 thereof. Housing 10 is formed with a conical aft end 18 having a plurality of nozzles 20, 20', 20'' attached thereto in concentric sets, as an be seen in FIG. 2. More specifically, the nozzles extend axially from the aft end of the housing and at their forward ends communicate with the interior of the housing. Nozzles 20 are evenly spaced apart around the base of the conical aft end portion 18 of the housing; nozzles 20' are evenly spaced apart on a circle which encircles said aft end and which is located intermediate the base and apex thereof; and nozzles 20'' are evenly spaced apart on a circle which encircles said aft end adjacent the apex thereof. Nozzles in the same set have the same exit diameter, and the diameter of the nozzles decrease in size inwardly (i.e., the diameter of nozzles 20 is larger than that of nozzles 20', and the diameter of the latter is larger than that of nozzles 20''). Furthermore, the aft edges of the nozzles in the respective sets are aligned relative to parallel planes disposed perpendicular to the longitudinal axis of housing 10 and spaced apart axially thereof, the aft ends of nozzles 20 being farther upstream, the aft ends of nozzles 20'' being farthest downstream, and nozzles 20' terminating at a plane located approximately equidistant from the planes which include the aft ends of nozzles 20 and 20''.

Figure 3:
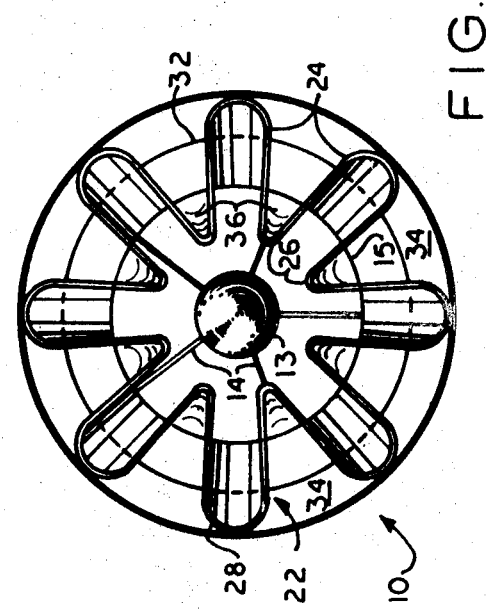
FIG. 3 is a cross-sectional view of the aforesaid housing, taken along the plane represented by line 3—3 in FIG. 1 ad in the direction indicated therein.

Generally designated by the number 22 in FIGS. 1 and 3 is a corrugated ring the forward end of which is fixedly connected to the aft end 15 of turbine case 16. The lobes 24 formed by the corrugations of this ring are evenly spaced apart peripherally of housing 10 and gradually increase in radial dimension in the downstream direction so that their aft edge project inwardly from the wall of the turbine case at 26 and outwardly to the wall of housing 10 at 28, the forward edge of the ring being circular and the aft edge 30 of the ring having the shape illustrated in FIG. 3. A tubular inner wall 32 is disposed in spaced relation around engine 12 and turbine case 16 and curves inwardly at the aft end of the latter to join therewith.

Operation of the First Embodiment

As illustrated by the single-headed arrows 34 in FIG. 1, fan air of engine 12 flows through the annulus between housing 10 and inner wall 32 and thence through the spaces 34 (see FIG. 3) between lobes 24 to the portion of the interior of said housing which is located between the aft edge 30 of ring 22 and the forward ends of nozzles 20, which interior portion of the housing will be referred to hereinafter as the mixing chamber. It will be noted in FIG. 1 that a portion of the fan air enters the mixing chamber at the outer portion thereof (i.e., the portion of said chamber disposed adjacent the wall of housing 10), and that the remainder of the fan air follows the rearwardly convergent troughs 36 of ring 22 and thus flows into the inner portion of the mixing chamber. As illustrated in FIG. 1 by double-headed arrows 36, exhaust gas of engine 12 flows through ring 12 in order to reach the mixing chamber, a portion of said exhaust gas entering the inner portion of said chamber and the remainder of the exhaust gas following outwardly through the radially projecting passages bounded by the inner surfaces of lobes 24.

A relatively large volume of the mixture of fan air and exhaust gas of engine 12 is discharged through the large diameter nozzles 20, and the exhaust streams issuing from these nozzles start to mix with ambient air upstream from the exits of nozzles 20'. The exit planes of nozzles 20' and 20'' define two other loci where mixing of ambient air with the streams of exhaust gas and fan air begins, and and vortices are thus created in the exhaust plume of the described jet propulsion assembly at points spaced apart longitudinally thereof. The existence of these vortices in the exhaust plume results in thorough, rapid mixing of ambient air with the fan air and exhaust gas discharged from the nozzles, thus reducing the noise associated with the operation of engine 12.

Second Embodiment of the Invention

To facilitate testing, in the embodiment of the invention illustrated in FIG. 4 a tubular housing, generally designated by the number 38, may comprise a cylindrical forward portion 40 (only a part of which appears in the drawing) and an aft portion 42 which at its cylindrical forward end is attached by suitable means to the forward portion so that it can rotate about the longitudinal axis thereof. An arcuate gear rack 44 extends around 180° of the outer surface of housing portion 42 and is located adjacent the forward edge 46 thereof. Mounted on the outer surface of housing section 40 is a suitable drive motor 48 having a drive shaft 50 which projects from the aft end thereof. A gear 52 (see FIG. 5) is carried by the drive shaft of motor 48 and engages the teeth on the outer side of gear rack 44. It should be clearly understood that the nozzle arrangement which will now be described is not limited to use with a housing formed with a rotatably rear portion and provided with drive components such as gear rack 44, drive motor 48, shaft 50, and gear 52. However, the described rotatable arrangement of aft portion 42 of housing 38 of the second embodiment facilitates the testing of the orientation of the nozzles of the second embodiment which provides optimum sound suppression in a selected direction.

The aft end of housing section 42 has the general form of a cone the apex of which is spaced from the longitudinal axis of housing 38. A plurality of nozzles 54, 54', 54'' are mounted on the conical aft portion of housing section 42, these nozzles being arranged in three concentric sets and nozzles in the same set having the same exit diameter and the exit diameters of the nozzles decreasing in size as the distance of the sets from the outermost set increases. Thus in the rear elevational view of FIG. 5 the nozzles of the second embodiment have the same configuration as the nozzles 20, 20', 20'' illustrated in FIG. 2. However, the aft ends of the nozzles 54, 54' 54'' are in each set thereof progressively located farther downstream as the distance between the nozzles and the upper side of housing 38 increases (when the aft housing section 42 is rotated to the position which is illustrated in FIGS. 4 and 5). In addition, nozzles 54' and 54'' generally terminate along a first plane disposed oblique to the longitudinal axis of housing 38, whereas nozzles 54 generally terminate along a second plane also disposed oblique to the longitudinal of said housing and parallel to the first plane but upstream from the first plane. If desired, the innermost nozzles 54'' may alternatively be arranged so that they generally terminate along a third plane disposed oblique to the longitudinal axis of housing 38 and parallel to the first and second plaNes but downstream from the first plane. It should be noted that the aft edge of each nozzle 54, 54', 54'' lies in a plane perpendicular to the longitudinal axis of housing 38.

Operation of the Second Embodiment

If the engine enclosed within housing 38 of the embodiment illustrated in FIGS. 4 and 5 is a fan-jet engine, fan air and exhaust gas are preferably mixed within the housing by means of a convoluted ring such as that identified by the number 22 in FIG. 1. The exhaust streams discharged from nozzles 54, 54', 54'' are mixed with one another and with ambient air in mixing zones which are spaced apart in the downstream direction and which are disposed oblique to the longitudinal axis of the housing. There is a velocity gradient in the flow of the exhaust gas at points spaced along a plane disposed perpendicular to the longitudinal axis of the housing, and thus the exhaust plume curves in the direction of the nozzles which terminate farthest upstream (i.e., upwardly in the orientation of the nozzles illustrated in FIG. 4). This curvature of the exhaust plume causes the greater portion of the sound energy associated with said exhaust plume to travel away from the nozzles which terminate farthest downstream. Motor 48 can be operated to rotate housing section 42 about the longitudinal axis of housing 40, thus permitting the direction of propagation of exhaust stream noise to be readily studied during testing of the described apparatus.

Third Embodiment of the Invention

Figure 7:
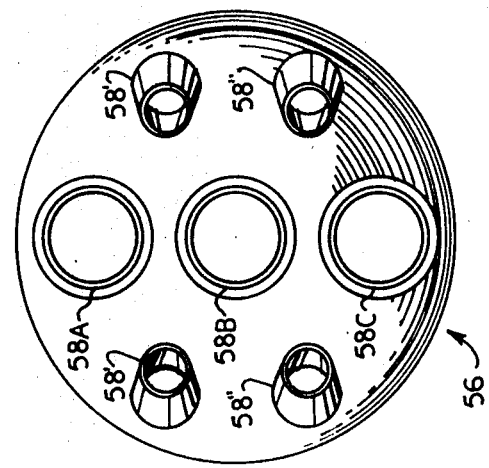
FIG. 7 is a rear elevational view of the third embodiment.
Figure 6:
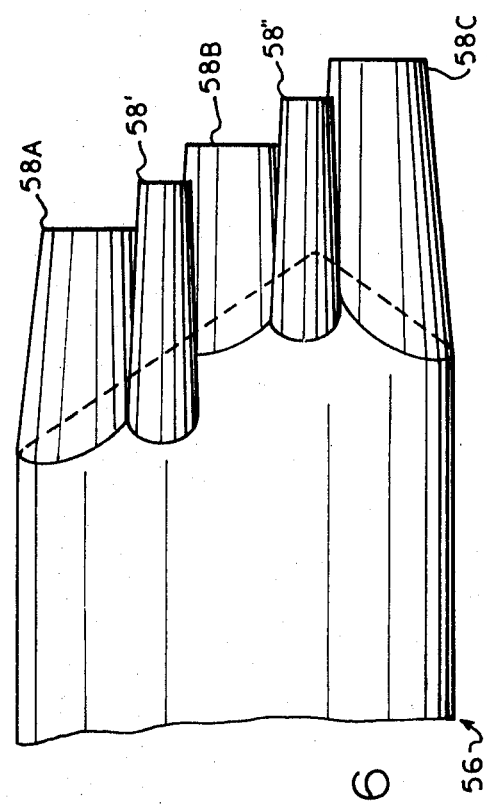
FIG. 6 is a schematic side elevational view of a third embodiment of the invention.
Figure 8:
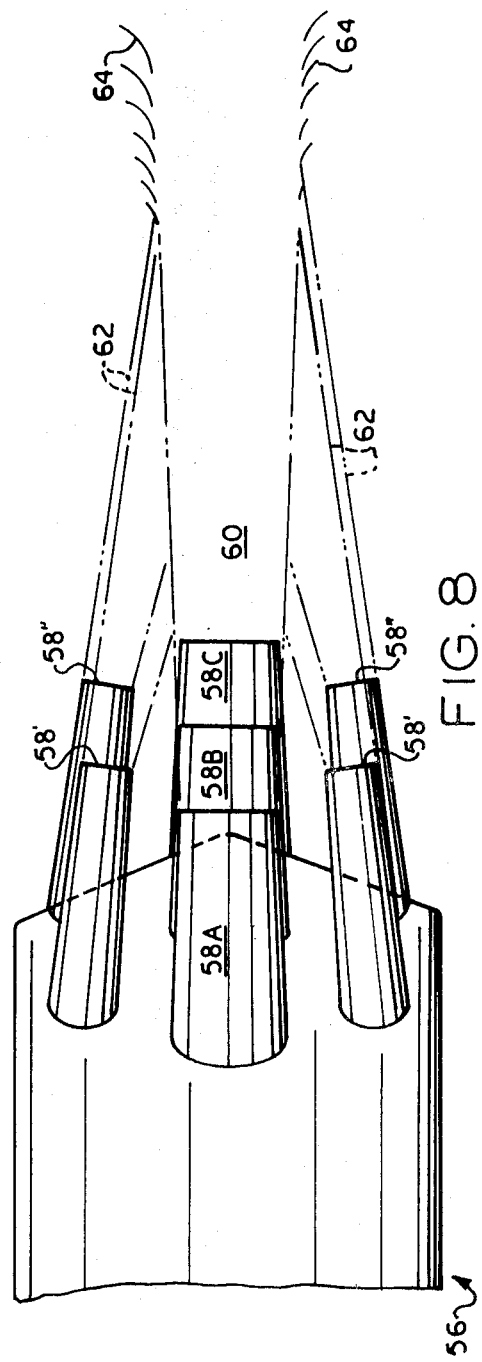
FIG. 8 is a plan view of the third embodiment.

The housing 56 which is illustrated in FIGS. 6-8 has the same form as housing 38 of the aforedescribed second embodiment, but the arrangement of the nozzles associated therewith is different from those of the latter housing. As can be seen in FIG. 7, three nozzles 58a, 58b, 58c, are attached to housing 56 so that their longitudinal axes are disposed in a vertical plane and extend horizontally in parallel relation to one another. On each side of nozzles 58 are two vertically aligned nozzles 58', 58'' the longitudinal axes of the upper and lower pairs of which respectively lie in two horizontal planes and which are convergent in the downstream direction. The aft ends of the nozzles in each of the three vertically aligned sets generally terminate along a plane disposed oblique to the longitudinal axis of housing 56, the aft ends of the uppermost nozzles 58' being farther upstream than the aft ends of the lowermost nozzles 58'' and the aft end of the middle nozzle 58b being downstream from the aft end of nozzle 58a and upstream from the aft end of nozzle 58c as illustrated in FIG. 6.

Operation of the Third Embodiment

The exhaust streams discharged from nozzles 58a, 58b, 58c combine at a point located a short distance downstream from housing 56, forming a flat, main stream 60 which has a minimum dimension in the horizontal direction and a maximum dimension in the vertical direction. As illustrated in FIG. 8, secondary exhaust streams 62 discharged from nozzles 58', 58'' respectively impinge upon the sides of the main stream and create turbulence 64 in said stream which causes most of the noise generated thereby to travel horizontally instead of downwardly.

Fourth Embodiment of the Invention

In the embodiment illustrated in FIG. 9, a housing, generally designated by the number 66, is formed with an end wall 68 that slopes downwardly and rearwardly as illustrated. A plurality of nozzles, each generally designated by the number 70, are mounted on the aft end of said housing and spaced apart across the end wall 68 thereof in any desired arrangement, such as in concentric sets of the type described hereinbefore. Each nozzle 70 except the uppermost nozzle comprises a tubular forward section 72 which is fixedly attached to the housing and a rear tubular section 74 which is telescoped over the forward section so that it can be moved axially thereof.

Operation of the Fourth Embodiment

The frequency of the noise generated by jet streams issuing from nozzles constructed in accordance with this invention depends upon the spacing of the different zones where said streams are mixed with ambient air and with one another. Since sections 74 of nozzles 70 can be moved relative to sections 72 thereof, the aft ends of the nozzles can be positioned at different points downstream from housing 66 to thereby facilitate the determination of the axial spacing of the nozzle exits which produces sound waves having frequencies most rapidly attenuated as they propagate through the atmosphere. The same arrangement also facilitates the determination of the staggered pattern of the nozzles which best directs sound waves in a desired direction for different jet propulsion assemblies.

Although this invention has been described with reference to particular embodiments of same, it should not be limited thereto for various changes and modifications could be made by one having ordinary skill in the art without departing from the spirit and scope of this invention as defined in the following claims.

What is claimed as new and useful and desired to be secured by U.S. Letters Patent is:

1. In a jet propulsion assembly wherein a jet engine is enclosed within an elongate housing, the combination comprising a plurality of tubular nozzles attached to and extending rearwardly from the aft portion of said housing, exhaust gas of said engine discharging through said nozzles, said nozzles being spaced apart in a plane transverse to the longitudinal axis of said housing and the aft ends of at least some of said nozzles being located at different distances downstream form said engine, said nozzles being arranged in concentric sets, the aft ends of the nozzles in each of the sets being located progressively farther downstream as the distance between the respective nozzles and one side of said housing increases, the aft portion of said housing being rotatable about the longitudinal axis thereof, and means mounted on said housing to rotate said aft portion about said longitudinal axis.

2. In a jet propulsion assembly wherein a jet engine is enclosed within an elongate housing, the combination comprising a plurality of tubular nozzles attached to and extending rearwardly from the aft portion of said housing, exhaust gas of said engine discharging through said nozzles, said nozzles being spaced apart in a plane transverse to the longitudinal axis of said housing and the aft ends of at least some of said nozzles being located at different different distances downstream from said engine, said nozzles being arranged so that a portion of said exhaust gas is essentially discharged to ambient air in a flat, main exhaust stream having a minimum dimension in the horizontal direction and a maximum dimension in the vertical direction, portions of said main stream being discharged to ambient air at points spaced apart axially of said housing, the remainder of said exhaust gas being discharged to ambient air through nozzles located on opposite sides of said main stream and inclined in the direction thereof in the downstream direction so that at least one secondary exhaust stream is directed against each side of said main stream.

3. In a jet propulsion assembly wherein a jet engine is enclosed within an elongate housing, the combination comprising a plurality of tubular nozzles attached to and extending rearwardly from the aft portion of said housing, exhaust gas of said engine discharging through said nozzles, said nozzles being spaced apart in a plane transverse to the longitudinal axis of said housing and the aft ends of at least some of said nozzles being located at different distances downstream from said engine, at least some of said nozzles being arranged so that their lengths can be varied.

4. In a jet propulsion assembly wherein a jet engine is enclosed within an elongate housing, the combination comprising a plurality of tubular nozzles attached to and extending rearwardly from the aft portion of said housing, exhaust gas of said engine discharging through said nozzles, said nozzles being spaced apart in a plane transverse to the longitudinal axis of said housing and the aft ends of at least some of said nozzles being located at different distances downstream from said engine, said engine being of the fan-jet type and a convoluted ring being attached to the aft end of engine thereof, said housing extending rearwardly from the aft end of said engine to provide a mixing chamber between the engine and the forward ends of said nozzles, the lobes of said ring extending axially of said housing and gradually increasing in radial dimension in the downstream direction so that their aft ends project both inwardly from the aft portion of said engine and outwardly therefrom toward said housing, fan air of said engine flowing through the annulus between said tailpipe and said housing and through the spaces between said lobes to said mixing chamber, and a portion of the exhaust gas of said engine flowing to said mixing chamber through the radially projecting passages bounded by the inner surfaces of said lobes, whereby alternately disposed streams of fan air and exhaust gas enter said mixing chamber.

5. A method of reducing the noise level of a fan-jet engine, comprising: discharging the turbine exhaust gas stream into a confined zone; discharging the fan air into the same zone to mix with the exhaust gas and cool it, and increase the mass flow; and discharging the gaseous mixture in such manner as to form a series of rearwardly extending concentric sleeves of the gaseous mixture which are mixed with ambient air in zones spaced apart axially of said gas stream.